US008723951B2

(12) United States Patent
Ahiska et al.

(10) Patent No.: US 8,723,951 B2
(45) Date of Patent: *May 13, 2014

(54) INTERACTIVE WIDE-ANGLE VIDEO SERVER

(75) Inventors: Bartu Ahiska, Esher (GB); Mark K. Davey, Bromley (GB); Yavuz Ahiska, Esher (GB)

(73) Assignee: Grandeye, Ltd. (GB)

( * ) Notice: Subject to any disclaimer, the term of this patent is extended or adjusted under 35 U.S.C. 154(b) by 1505 days.

This patent is subject to a terminal disclaimer.

(21) Appl. No.: 11/287,465

(22) Filed: Nov. 23, 2005

(65) Prior Publication Data

US 2007/0124783 A1    May 31, 2007

(51) Int. Cl.
*H04N 7/18*    (2006.01)
*H04N 5/228*   (2006.01)

(52) U.S. Cl.
USPC ............... 348/143; 348/208.3; 348/211.11

(58) Field of Classification Search
USPC .......... 358/1.1, 1.9, 1.11–1.18; 348/143, 211, 348/208.3, 211.11, 571; 375/240; 382/243
See application file for complete search history.

(56) References Cited

U.S. PATENT DOCUMENTS

| | | |
|---|---|---|
| 3,725,563 A | 4/1973 | Woycechowsky |
| 4,656,506 A | 4/1987 | Ritchey |
| 4,667,236 A | 5/1987 | Dresdner |
| 4,728,839 A | 3/1988 | Coughlan |
| 4,763,280 A | 8/1988 | Robinson et al. |
| 4,772,942 A | 9/1988 | Tuck |
| 4,821,209 A | 4/1989 | Hempel et al. |
| 4,905,077 A | 2/1990 | Ishii |
| 5,023,725 A | 6/1991 | McCutchen |
| 5,027,287 A | 6/1991 | Artigalas et al. |
| 5,047,868 A | 9/1991 | Takeda et al. |
| 5,067,019 A | 11/1991 | Juday et al. |
| 5,068,735 A | 11/1991 | Tuchiya et al. |
| 5,130,794 A | 7/1992 | Ritchey |
| 5,185,667 A | 2/1993 | Zimmermann |
| 5,321,776 A | 6/1994 | Shapiro |
| 5,325,483 A | 6/1994 | Ise et al. |
| 5,359,363 A | 10/1994 | Kuban et al. |
| 5,384,588 A | 1/1995 | Martin et al. |
| 5,396,284 A | 3/1995 | Freeman |
| 5,434,617 A | 7/1995 | Bianchi |
| 5,444,478 A | 8/1995 | Lelong et al. |

(Continued)

FOREIGN PATENT DOCUMENTS

| | | |
|---|---|---|
| EP | 1 341 383 A2 | 9/2003 |
| WO | 9750252 A | 12/1997 |
| WO | 0195608 A | 12/2001 |
| WO | WO 02/062056 A1 | 8/2002 |

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner* — Thierry L Pham
(74) *Attorney, Agent, or Firm* — Robert O. Groover; Seth A. Horwitz; Gendolyn S. S. Groover (57) ABSTRACT

An interactive video server which enables multiple clients to independently and interactively extract views from a one or more wide-angle imagery sources is disclosed.

20 Claims, 8 Drawing Sheets

(56) References Cited

U.S. PATENT DOCUMENTS

| | | | |
|---|---|---|---|
| 5,495,292 | A | 2/1996 | Zhang |
| 5,495,576 | A | 2/1996 | Ritchey |
| 5,644,715 | A | 7/1997 | Baugher |
| 5,666,157 | A | 9/1997 | Aviv |
| 5,684,937 | A | 11/1997 | Oxaal |
| 5,877,801 | A | 3/1999 | Martin et al. |
| RE36,207 | E | 5/1999 | Zimmermann |
| 6,049,281 | A | 4/2000 | Osterwell |
| 6,121,966 | A | 9/2000 | Teodosio et al. |
| 6,147,709 | A | 11/2000 | Martin et al. |
| 6,201,574 | B1 | 3/2001 | Martin |
| 6,215,519 | B1 | 4/2001 | Nayar et al. |
| 6,226,031 | B1 | 5/2001 | Barraclough et al. |
| 6,243,099 | B1 | 6/2001 | Oxaal |
| 6,337,708 | B1 | 1/2002 | Furland |
| 6,344,852 | B1 | 2/2002 | Zhu |
| 6,509,926 | B1 | 1/2003 | Mills et al. |
| 6,526,176 | B1 | 2/2003 | Kovacevic |
| 6,603,502 | B2 | 8/2003 | Martin |
| 6,675,386 | B1 * | 1/2004 | Hendricks et al. ............ 725/105 |
| 6,724,421 | B1 | 4/2004 | Glatt |
| 6,732,162 | B1 | 5/2004 | Wood |
| 6,741,250 | B1 * | 5/2004 | Furlan et al. ................ 345/427 |
| 6,757,434 | B2 | 6/2004 | Miled et al. |
| 6,763,068 | B2 | 7/2004 | Oktem |
| 6,928,230 | B2 | 8/2005 | Squibbs |
| 7,058,237 | B2 | 6/2006 | Liu |
| 7,114,170 | B2 | 9/2006 | Harris et al. |
| 7,450,165 | B2 | 11/2008 | Ahiska |
| 7,529,424 | B2 | 5/2009 | Ahiska |
| 2001/0016849 | A1 | 8/2001 | Squibbs |
| 2001/0017668 | A1 | 8/2001 | Wilcock et al. |
| 2002/0063802 | A1 | 5/2002 | Gullichsen |
| 2003/0088575 | A1 | 5/2003 | Gould et al. |
| 2003/0128756 | A1 | 7/2003 | Oktem |
| 2003/0229900 | A1 | 12/2003 | Reisman |
| 2004/0199575 | A1 | 10/2004 | Geller |
| 2004/0218099 | A1 * | 11/2004 | Washington .................. 348/571 |
| 2005/0007478 | A1 * | 1/2005 | Ahiska ......................... 348/335 |
| 2005/0195899 | A1 * | 9/2005 | Han ........................ 375/240.21 |

OTHER PUBLICATIONS

Y. Yardimci, I. Yilmaz, A. E. Cetin, "Correlation Tracking Based on Wavelet Comain Information," Proceedings of SPIE vol. #5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. on Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

International Search Report, PCT Application.

International Preliminary Report on Patentability.

Written Opinion.

\* cited by examiner

```
// Xpos     = X Position of point P in the View
// yPos     = Y Position of point P in the View
// xSize    = Horizontal size of View
// ySize    = Vertical size of View
// theta    = Pan angle of Vcam
// phi      = Tilt angle of Vcam
// VFOV     = Vertical field of view of Vcam // qTheta   = Calculated Pan of point with screen coordinates
//            (xPos,yPos)
// qPhi     = Calculated Tilt of point with screen coordinates
//            (xPos,yPos)

// trans    = Distance of camera from origin (centre of sphere)
//                0 = at centre of sphere
//                1 = on back face of the sphere void GeomUtils::CalcSpherical(float xPos, float yPos,
                   int xSize, int ySize,
                   float theta, float phi, float VFOV,
                   float& qTheta, float& qPhi, float trans){ float phi_hat[3], theta_hat[3];
float p[3], c[3], camera[3], origin[3];
float inter[6];

// Define origin point
origin[0] = 0.0f;
origin[1] = 0.0f;
origin[2] = 0.0f;

// cos and sin of theta and phi calculated just once
float ct = cosf(theta);
float st = sinf(theta);
float cp = cosf(phi);
float sp = sinf(phi);

// Screen position relative to centre of image
float xs = xSize / 2;
float ys = ySize / 2;
float px = xPos - xs;
float py = yPos - ys;

// Coordinates for screen centre point projected into the sphere.
// Sphere has radius of 1...
c[0] = ct*sp;
c[1] = st*sp;
c[2] = cp;

// Place the camera along the vector passing through c and the origin
camera[0] = c[0] * -trans;
camera[1] = c[1] * -trans;
camera[2] = c[2] * -trans;

// Calculate d, the NUMBER OF PIXELS from c to the camera.
// By dividing the distance from c to the camera in in world units
// (1+trans) by d, we provide a conversion from world units into
pixels.
```

Figure 10

```
//
//                                  .......
//                     .......        .
//                                    .  ys
//          ...  VFOV/2.0             .
// Camera ----------------------------. c
//                    d
float ay = tanf(VFOV/2.0f);
float ny = ay/ys;
float d = 1.0f / ny;

// Now calculate conversion
pixelInWorldUnits = (1.0f + trans) / d;

// Now work out the unit vectors IN PIXELS
// These are based on theta_hat and phi_hat.
// (See Wolfram website for Spherical Coords)
//
// phi_hat   = [cos(theta)cos(phi),sin(theta)cos(phi),-sin(phi)]
// theta_hat = [-sin(theta), cos(theta), 0]

//The unit vectors naturally have a length of 1 world units. We need
them to //have a length of 1 pixel in world units.

theta_hat[0] =  -st * pixelInWorldUnits;
theta_hat[1] =   ct * pixelInWorldUnits;
theta_hat[2] = 0.0f * pixelInWorldUnits;

phi_hat[0] = ct*cp * pixelInWorldUnits;
phi_hat[1] = st*cp * pixelInWorldUnits;
phi_hat[2] =   -sp * pixelInWorldUnits;

//Cartesian coordinates for P
p[0] = c[0] + px*theta_hat[0] + py*phi_hat[0];
p[1] = c[1] + px*theta_hat[1] + py*phi_hat[1];
p[2] = c[2] + px*theta_hat[2] + py*phi_hat[2];

// Get Cartesian coordinates for the intersection point on the sphere
// between point P and the camera. Result returned in inter.
int numIntersections =
SphereLineIntersection(camera,p,origin,1.0f,inter);

// Spherical coordinates for the intersection
float r = sqrtf(square(inter[0]) + square(inter[1]) +
square(inter[2]));
qTheta = atan2f(inter[1], inter[0]);
qPhi = acosf(inter[2]/r);
}
```

Figure 10 (continued)

```
// qTheta,qPhi   = Spherical coordinate of point (radius = 1)
// xCentre       = X Centre of Fisheye circle in pixels
// yCentre       = Y Centre of Fisheye circle in pixels
// x,y           = Returned 2D coordinate on image containing
//                 fisheye circle // The LensTable allows the program to look up radii on the fisheye
// image given a qPhi (polar angle from the z axis) value.

WorldToFisheyeCoords(float qTheta, float qPhi,
          float yCentre, float yCentre,
          float& x, float& y)
{
  // Look up in the Len Table the radius corresponding to qPhi (tilt)
  float rad = LensTable->GetRadius(qPhi);

// Generate 2D Cartesian coordinates from polar coordinates (rad,
qTheta)
  x = rad * cosf(qTheta) + circleXCentre;
  y = rad * sinf(qTheta) + circleYCentre;
}
```

INTERACTIVE WIDE-ANGLE VIDEO SERVER

BACKGROUND AND SUMMARY OF THE INVENTION

The present application relates to video transmission, and more particularly to an interactive wide-angle video server.

DESCRIPTION OF BACKGROUND ART

Real-time video surveillance systems have become increasingly popular in security monitoring applications. In particular the ability to monitor a wide-angle field of view (FOV) is important as it leads to a large situational awareness of an environment. A camera can be used with a wide-angle optical system such as a fisheye lens to capture wide-angle video, typically with a field of view of approximately 180 degrees. The constant improvements in the imaging technology used to capture the video are responsible for an observed increase in output resolution, and consequently the corresponding output data-rates.

The ability to remotely monitor wide-angle video applications is becoming particularly important. The U.S. Pat. No. 6,603,502, entitled "System for Omnidirectional Image Viewing at a Remote Location Without the Transmission of Control Signals to Select Viewing Parameters," which is hereby incorporated by reference, describes a system for achieving perspective corrected views at a location removed from the creation site of a distorted wide-angle image. A notable advantage of this system is that it operates without the transmission of control signals from the removed locations. The system transmits the wide-angle output from a camera to multiple sites. This process will require significant bandwidth due to the increasing resolution of wide-angle images. Although the patent acknowledges the requirement for compressing imagery when transmitting data over bandwidth-limited telephone lines, any such compression unavoidably leads to a loss of quality. This is called the "available transmission bandwidth problem".

U.S. Prov. Pat. App. No. 60/627,531, entitled "Interactive Media Server," which is hereby incorporated by reference, describes a web-based server servicing a fixed number of clients with media-streams in response to received view-requests. The streams consist of distortion-corrected views extracted from a wide-angle video source by using image-processing circuitry. Through streaming transformed views corresponding to requested portions of the wide-angle video, the system offers a solution to the available transmission bandwidth problem. The clients are lightweight web clients, not requiring sophisticated graphics hardware. These advantages are achieved by compromising the simplicity of the server, which now requires powerful dedicated image processing and client-handling hardware.

When a video camera is used with a conventional fisheye lens, the image output by the camera is distorted. This distortion is typically circular for a circular imaging system, but can be of other shapes, depending on the lens system implemented. This distortion needs to be alleviated in real-time to allow correct viewing. Systems and methods for transforming a wide-angle image from one perspective form to another have been implemented using different techniques, and generally may be divided into three separate categories:

(1) tabular distortion-correction systems and methods;
(2) three-dimensional (3D) projection systems and methods; and
(3) two-dimensional (2D) transform mapping systems and methods.

The first category includes U.S. patent application Ser. No. 10/837,012, entitled "Correction of Optical Distortion by Image Processing," which is hereby incorporated by reference. The distortion is corrected by reference to a stored table that indicates the mapping between pixels of the distorted image and pixels on the corrected image. The table is typically one of two types: it may be a forward table in which the mapping from distorted image to corrected image is held, or it may be a reverse table holding the mapping from corrected image to distorted image. On the other hand, U.S. patent application Ser. No. 10/186,915, entitled "Real-Time Wide-Angle Image Correction System and Method for Computer Image Viewing," which is hereby incorporated by reference, generates warp tables from pixel coordinates of a wide-angle image and applies the warp table to create a corrected image. The corrections are performed using a parametric class of warping functions that include Spatially Varying Uniform (SVU) functions.

The second category of systems and methods use 3D computer graphics techniques to alleviate the distortion. For example, U.S. Pat. No. 6,243,099, entitled "Method for Interactive Viewing Full-Surround Image Data and Apparatus Therefor," which is hereby incorporated by reference, discloses a method of projecting a full-surround image onto a surface. The full-surround image data is texture-mapped onto a computer graphics representation of a surface to model the visible world. A portion of this visible world is projected onto a plane to achieve one of a variety of perspectives. Stereographic projection is implemented by using a spherical surface and one-to-one projecting each point on the sphere to points on an infinite plane by rays from a point antipodal to the sphere and the plane's intersection.

The third category includes U.S. Pat. No. Re 36,207, entitled "Omniview Motionless Camera Orientation System," which is hereby incorporated by reference, which discloses a system and method of perspective correcting views from a hemispherical image using 2D transform mapping. The correction is achieved by an image-processor implementing an orthogonal set of transform algorithms. The transformation is predictable and based on lens characteristics.

These transformations alleviate the typical distortion and perception problems in a wide-angle image. One or more views can be generated and steered about the wide-angle video in real-time. A new class of camera replaces the mechanical Pan-Tilt-Zoom (PTZ) functions with a wide-angle optical system and image processing, as discussed in U.S. patent application Ser. No. 10/837,019 entitled "Method of Simultaneously Displaying Multiple Views for Video Surveillance," which is hereby incorporated by reference. This class of camera is further discussed in U.S. patent application Ser. No. 10/837,325 entitled "Multiple View Processing in Wide-Angle Video Camera," which is hereby incorporated by reference. This type of camera monitors a wide field of view and selects regions from it to transmit to a base station; in this way it emulates the behaviour of a mechanical PTZ camera. The wide-angle optics introduces distortion into the captured image, and processing algorithms are used to transform the distortion and convert it to a view that has similar projection as a mechanical PTZ camera.

Interactive Wide-Angle Video Server

The present innovations include, in one class of embodiments, an interactive wide-angle video server that receives requests and information from clients, and sends to the clients distorted portions of the wide-angle video which are preferably modified by the client. In preferred embodiments, the server feeds, over time, selected uncorrected portions of wide-angle video to clients based on their requests. The available transmission bandwidth problem is addressed, but at the expense of computation within the clients and the transmission of request-signals from the clients to the server. The server is preferably not used to produce distortion-correcting views from a wide-angle video. The clients preferably have the task of computing the views by transforming said requested portions of the wide-angle image. In preferred embodiments, the present innovations generate on-demand PTZ views at a remote client by generating view-requests which are sent to a server.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

One class of preferred embodiments includes a web-based server connected to one or more wide-angle video sources (such as a wide-angle video camera or a video storage device). The sources may, for example, be indirectly connected to the server through the web, or directly connected through a Local Area Network (LAN), or connected by other means. Many typical connections between the server and a client will not have sufficient bandwidth to feed a full size wide-angle video sequence in the form received from a source. To alleviate the bandwidth limitations, the server is preferably capable of extracting a number (one or more) of portions of an input wide-angle video and distributing them in real-time to one or more clients based on view-requests issued by the clients to the server.

Figure 9:
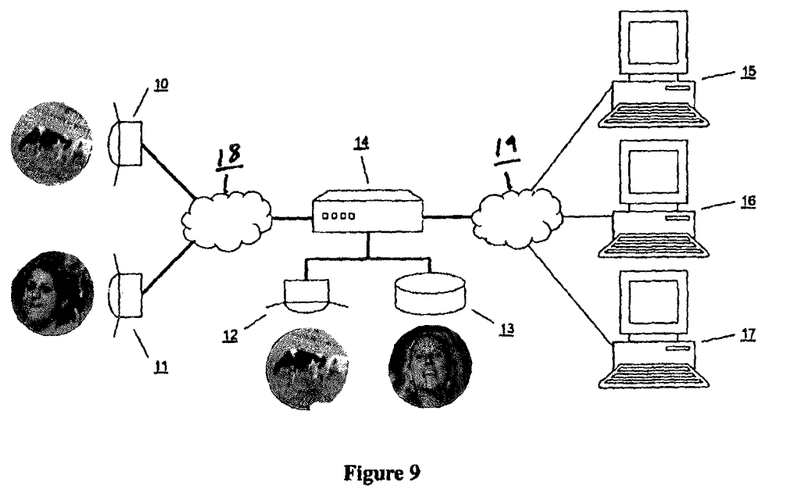
FIG. 9 shows another example method consistent with a preferred embodiment of the present innovations.

FIG. 9 shows one example system consistent with implementing a preferred embodiment of the present innovations, containing multiple wide-angle video sources. In this preferred embodiment, wide-angle sources 10, 11, 12 can be remotely connected to the server 14 through a network connection 18 such as the web or by a LAN connection. These sources 10, 11, 12 may be wide-angle video cameras or other supplier of wide-angle video, such as a storage device 13. The LAN may be arranged in different topologies, including star, bus, collapsed backbone or ring. The server is preferably connected to one or more clients 15, 16, 17 through a network connection 19. The wide-angle video cameras are preferably implemented as cameras outfitted with wide-angle optical lenses, such as a fisheye or purpose-built lens designed to enhance peripheral vision, typically with a field of view in the region of 170 to 180 degrees. Other wide-angle input devices are of course also consistent with the present innovations. In preferred embodiments, the clients request receive inputs, such as local inputs from an operator or software (such as motion detection software) that serve as PTZ controls determining what view the client is requesting. Preferably, processing such as mapping pixel coordinates to wide-angle image coordinates is done at the client. The client preferably sends a view-request containing information identifying the image source (such as one or more of sources 10, 11, 12) and the portions or segments of that source that are being requested. The server 14 preferably extracts the requested segments from the wide-angle video of the source, as determined by the view-request, and feeds the segments to the client. In preferred embodiments, the data is compressed before being transmitted to the client, to save bandwidth. The client preferably transforms the received data (such as segments or portions) on local software and hardware, creating a view for display. The transforms can, for example, include 3D projection.

Figure 5:
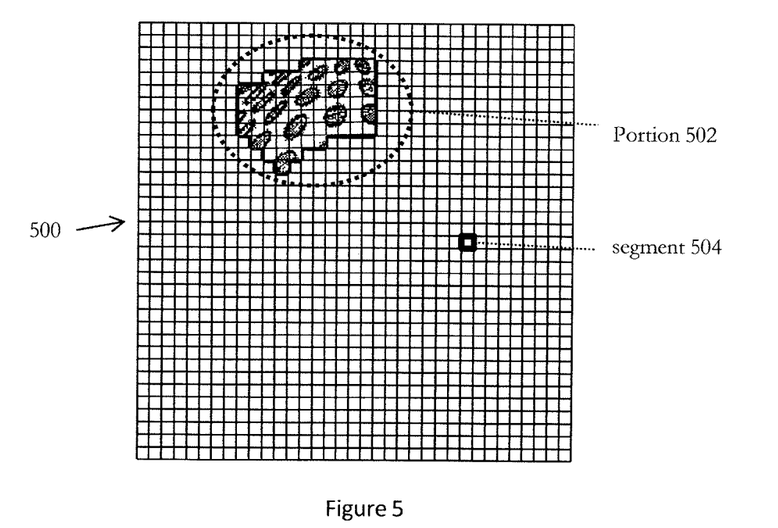
FIG. 5 shows another example method consistent with a preferred embodiment of the present innovations.

The response-time of the server is a key performance factor for interactivity. Clients serviceable by said server preferably have associated hardware and are capable of receiving and transforming a portion received from the server to generate a transformed-view for display. By feeding these limited portions to clients, the available bandwidth problem is alleviated. In a preferred embodiment the demand for bandwidth is further reduced by compressing the portions using known compression techniques, such as MPEG4 or JPEG compression. Portions may be represented with a finite number of segments. For example, FIG. 5 shows one example way to segment and apportion image data. In this example, the image data is shown in a Cartesian grid 500. A selected portion 502 is made up of a selected number of one or more subdivisions, such as segment 504. Of course, other implementations are possible within the scope of the present innovations, including but not limited to using different coordinate spaces, and greater numbers of subdivisions (such as sub-segments, etc.) or no subdivisions of portions at all.

Figure 4:
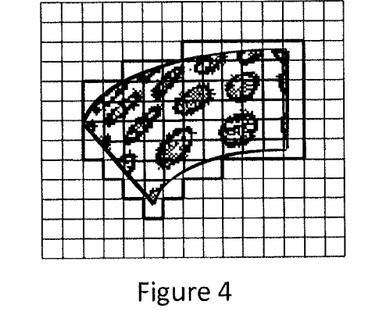
FIG. 4 shows another example method consistent with a preferred embodiment of the present innovations.

FIG. 4 shows a close-up of portion 502 from FIG. 5. The desired area in this example is shown to cover several segments, and together give a view of a particular region as captured by the camera or image source.

In preferred embodiments, a view-request is a request specifying the generation of portions. It preferably includes information identifying a wide-angle video source (source ID) and identifying the required portions to be extracted from it. Clients are preferably capable of issuing view-requests over time in response to computation on local device input such as mouse, keyboard or suitably adapted TV remote control input, or outputs from software (such as motion detection software). The view-request will typically be generated by processing PTZ commands from an operator, or from software performing motion analysis such as motion detection, moving region tracking or object tracking. In preferred embodiments, locally input PTZ commands are capable of steering the distortion-alleviated field-of-view (FOV) displayed by the client (client view).

The client view is preferably defined by a pan, tilt, and horizontal and vertical FOVs. As the client view is steered (e.g., by panning and tilting) different areas of the wide-angle scene will be visible, possibly requiring a different portion from the server. As the client view is zoomed-out, increasing the FOVs, a different larger portion may be required for a similar reason. Zooming-in, a function decreasing the FOVs, will result in a smaller portion being required. If portions are represented as segments, zooming-out will typically result in an increased total number of required segments, while zooming-in will typically result in fewer segments being required. As a client view will have a fixed output resolution, increasing the FOVs results in a lower number of pixels being allocated to each segment. The segments are therefore not required at as high a resolution. On the contrary, decreasing the FOVs results in segments being required at a higher resolution.

The clients may be capable of conveying characteristics to the server (such as client characteristics). The client characteristics can include, for example, required portion or segment resolution, available bandwidth and capability of graphics hardware, or other information. In a preferred embodiment, the server is capable of receiving and/or determining or estimating client characteristics and extracting portions with properties in response thereto. In the preferred embodiment the server can extract segments to correspond to a resolution required by a client. In a further embodiment the server may alter the data-rate of the fed segments to reflect the typically fixed bandwidth of the communication path between the server and a client, which may be overwhelmed in the instances where many segments are requested.

In a preferred embodiment, the server is capable of receiving and processing multiple wide-angle videos from a number sources. The maximum number of sources the server can handle will depend on its capabilities, such as the size of its processing circuitry. In the preferred embodiment, each source is given a source ID. The clients are capable of requesting portions extracted from a particular video feed using the appropriate source ID. The server preferably has access to, or holds, a frequently updated database of its source connections, their associated source IDs and a description of their physical geographic locations. Each client is preferably capable of requesting a search function to locate the source ID of a wide-angle video source most suited to its requirement. The search keywords may be obtained from a client operator through local device input. The returned source ID is then used in subsequent view-requests. In theory each source may service any number and combination of clients.

Figure 3:
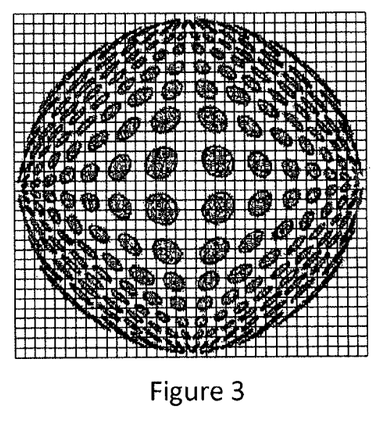
FIG. 3 shows another example method consistent with a preferred embodiment of the present innovations.

As the number of clients increase, portion extraction will place an increasing demand on the request-handling and processing hardware. In a possible embodiment using segments, the server extracts only the segments defined by each view-request and any client characteristics. In contrast, the preferred embodiment comprises of a server capable of servicing an indefinite number of view-requests by generating a finite number of segments. The number of segments depends upon the number of wide-angle video sources and the segmenting policy applied to each one. The policy may be different for every source connected to the server. In the preferred embodiment the wide-angle video image from a source is segmented in a regular rectangular grid, wherein the grid is defined by the number of segments in the horizontal and vertical directions. For example, FIG. 3 shows one possible segmentation of the wide-angle video.

In the preferred embodiment, part of a client's behavior can be conceptualized in a "virtual camera" (VCAM). It represents the extraction of a transformed view from a distorted wide-angle image. The VCAM may be controlled with electronic PTZ control to emulate the motion of a mechanical PTZ camera (the design of a mechanically steerable camera can be found in U.S. Pat. No. 4,728,839, entitled "Motorized Pan/Tilt Head for Remote Control," which is hereby incorporated by reference).

Figure 1:
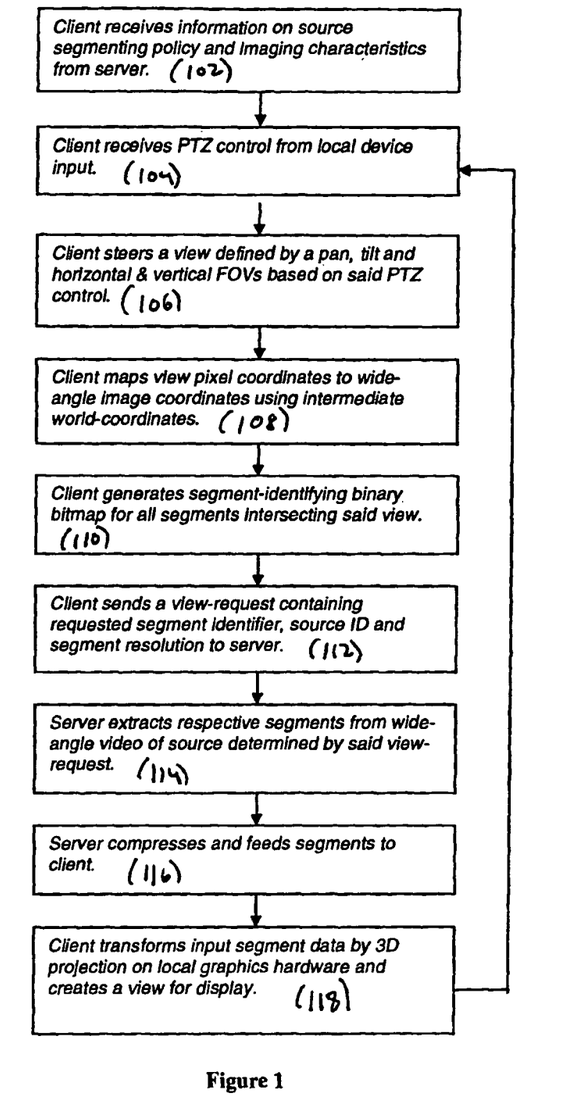
FIG. 1 shows a flowchart implementing process steps consistent with a preferred embodiment of the present innovations.

FIG. 1 shows a flowchart implementing process steps consistent with a preferred embodiment of the present innovations. In this embodiment, the client is displaying video based on a portion extracted from the wide-angle video output from a particular server-connected source with known source ID. Portions are represented as a plurality of segments. In this example flow, much of the processing burden is on the client, though variations in the distribution of burdens (and the specifics of the burdens themselves) are still within the scope of the present innovations.

First, the client receives information on the source segmenting policy and imaging characteristics from the server (step 102). The client then receives PTZ control signals, for example, from local device input or from software output (step 104). The client steers to a view based on the PTZ controls (step 106). The client then maps view pixel coordinates to wide-angle image coordinates using intermediate world coordinates (step 108). The client generates a segment-identifying binary bitmap for all segments intersecting the chosen view (step 110). The client sends a view-request containing the requested segment identifier, source ID, and segment resolution to the server (step 112). The server extracts the respective segments from the wide-angle video of the source determined in the view request (step 114). The server compresses the data and feeds segments to the client (step 116). The client transforms the input segment data by 3D projection on local graphics hardware and creates a view for display (step 118). The process then returns to the point at which the client receives further PTZ controls and proceeds.

Before the first view-request is made, the client preferably requests information on the lens/imaging characteristics of the source and the segmenting policy applied to it. In the preferred embodiment the server responds with information defining the regular rectangular grid used to divide the source video, consisting of the number of segments in the horizontal and vertical directions (See, for example, FIG. 3). It also responds with a table and numbers describing the imaging characteristics (see below, for example, description of LensTable, circleXCentre and circleYCentre).

The client receives PTZ control signals from a local device input, such as a joystick controller. The control signals can also be obtained from output of a software program, for example. The client view is defined by a pan, tilt and horizontal and vertical fields-of-view (FOV), and can be steered by said PTZ control. The defined client view has associated 2D screen coordinates.

Figure 10:
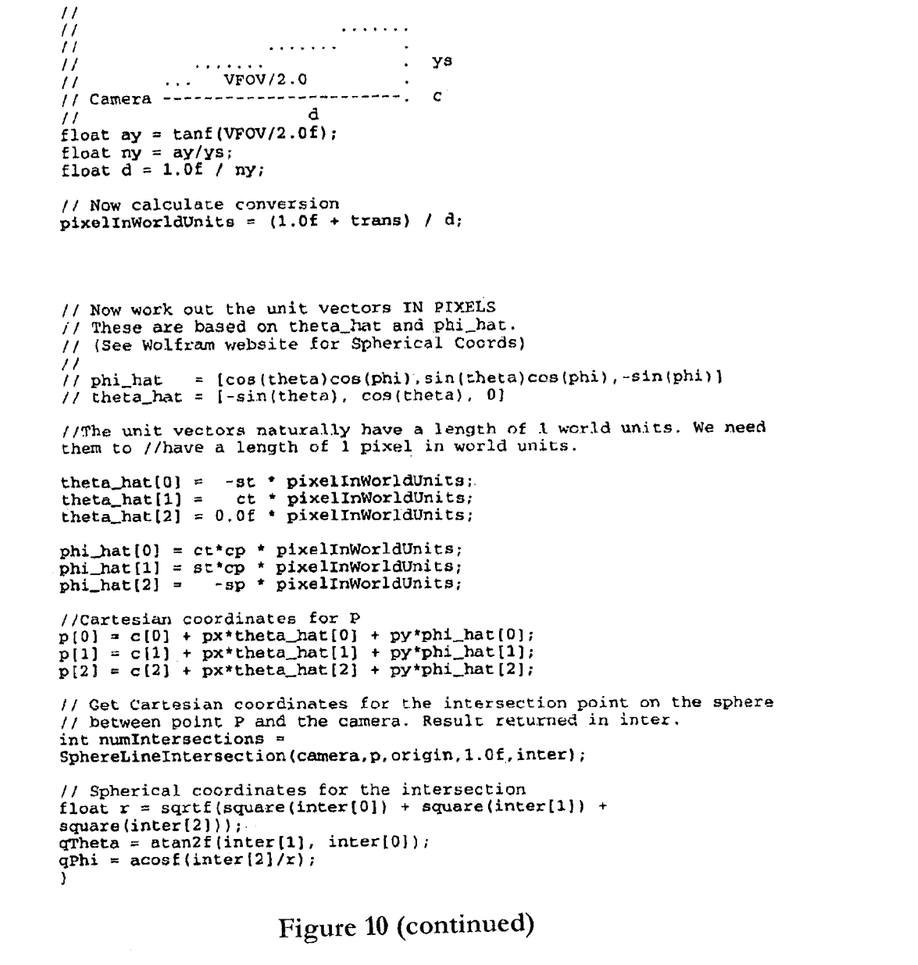
FIG. 10 shows another example method consistent with a preferred embodiment of the present innovations.

A function for mapping between every pixel (p) in the client view and an associated coordinate in the planar wide-angle image coordinate system is preferably used. In the preferred embodiment, this 2D-to-2D coordinate mapping is performed by introducing intermediate spherical-polar "world-coordinates" (see, for example, Mathworld: Coordinate Geometry, "Spherical Coordinates," Wolfram Research at http:mathworld.wolfram.com/sphericalcoordinates.html). 3D computer graphics techniques are used to project any pixel p onto a triangulated partial sphere surface with unity radius. For example, FIG. 10 shows example code consistent with this objective.

Figure 2:
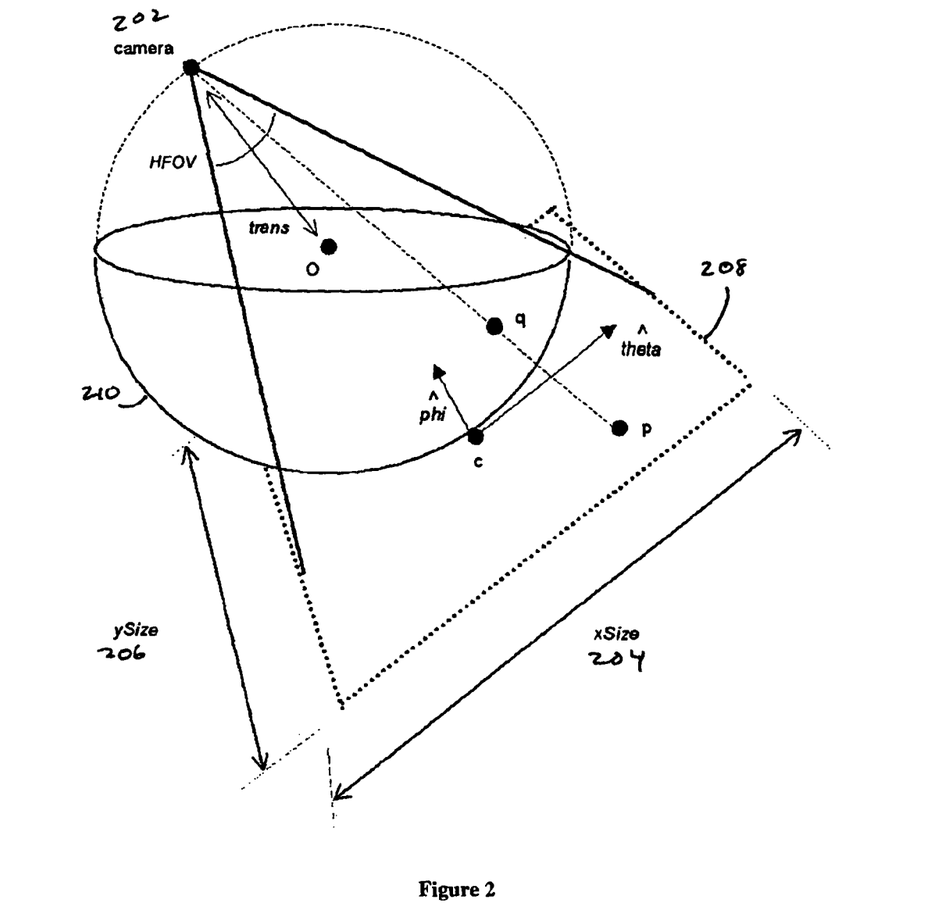
FIG. 2 shows one example method consistent with a preferred embodiment of the present innovations.

In an example implementation, pixel p lies on a plane (representing the client view) with size xSize, ySize. See, for example, FIG. 2 which shows geometry of a camera setup, including camera 202, a field of view, and the x- and y-extends of that field of view, labeled as xSize 204 and ySize 206. It is noted that this is only one possible geometric description consistent with an embodiment of the present innovations. The plane 208 is tangential to the partial sphere 210, with point of intersection c at the centre of the plane (determined by theta and phi: the pan and tilt angle of the virtual camera). The origin of the world coordinate system (O) is located in the centre of the sphere. A camera 202 exists along a line connecting point c with O. The camera is at a distance trans on the opposite side of O as c. If this distance is unity (same as the radius of the sphere), the client is performing stereographic projection; whereas a distance of zero entails linear perspective projection. A ray generated by connecting the camera to the point p will intersect the partial sphere at a point q, with coordinates (qTheta, qPhi, 1). In this way, the qTheta and qPhi of every associated point p may be calculated.

Figure 11:
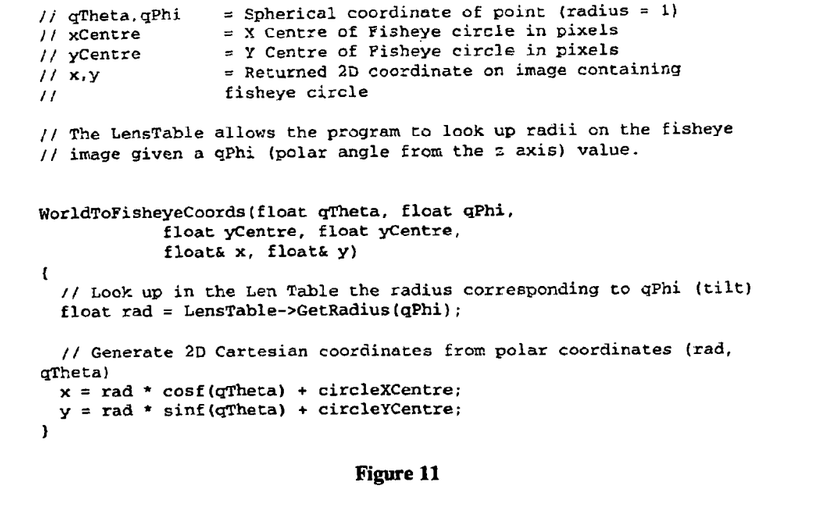
FIG. 11 shows another example method consistent with a preferred embodiment of the present innovations.
Figure 12:
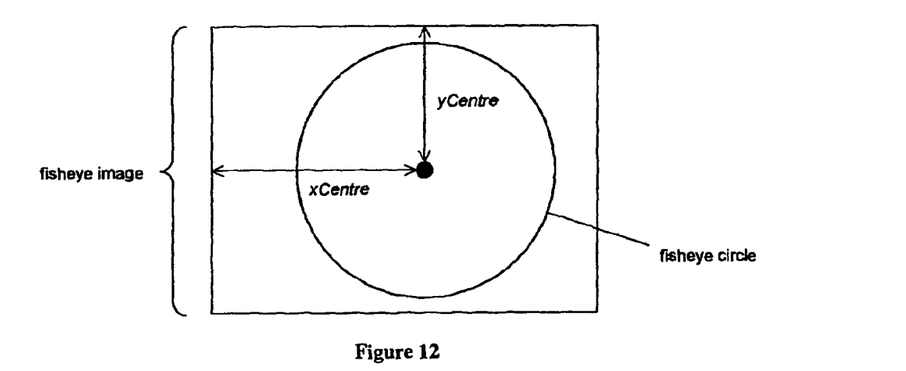
FIG. 12 shows another example method consistent with a preferred embodiment of the present innovations.

A function is preferably used to obtain the 2D coordinates on the wide-angle fisheye image corresponding to q (and therefore corresponding to p). This function, in some embodiments, depends on the characteristics of the lens used to capture the wide-angle image (see, for example, FIG. 11). In the preferred embodiment, a fisheye lens is used with a linear relationship between the captured FOV and the radial distance from the centre of the corresponding fisheye circle. The characteristics of imaging through the lens are stored in table (LensTable). LensTable returns a radius (rad in pixels) when given qPhi as input. The imaging process may result in a fisheye circle that is not in the centre of the fisheye image. For example, FIG. 12 shows an example characterized by circleXCentre and circleYCentre. Using this information, together with rad and qTheta, the 2D Cartesian coordinates (x,y) of the point on the fisheye image corresponding to point p are calculated.

The client can determine which segment intersects the point (x,y) on the wide-angle image corresponding to p. In the preferred embodiment consisting of regular rectangular segmentation, the function of identifying the segment of each pixel is obvious (see, for example, FIG. 4). The width and height of the planar wide-angle image are divided by the number of segments in the horizontal and vertical directions respectively, resulting in the width and height of the identically shaped segments. The (x,y) coordinate is used to calculate a grid position, measured from a corner of the image, which in turn identifies a segment.

In preferred embodiments, this function is applied to every point in the wide-angle image derived from all the p pixels in the client view. Any segment which is identified by at least one point is required to create a complete client view picture. A view-request is prepared and transmitted containing the source ID and an identifier for the required portion. In the preferred embodiment, segments contributing to the required portion can be identified by sending a 1 bit bitmap image, such as that shown in the example of FIG. 5. The bitmap has the same number of horizontal and vertical pixels as the number of segments in the horizontal and vertical directions of the segmenting grid (which was shown in FIG. 3). Each bit preferably represents an associated segment in the same grid position. The bit associated with any required segment is set HIGH (1), with all other bits set LOW (0). In other embodiments, a list of segment grid-position identifiers can be sent as a vector list or run-length coded. The client may also be capable of conveying client characteristics to the server. In the preferred embodiment the client can request a resolution for all requested segments.

In the preferred embodiment, the server is capable of receiving the view-requests and extracts all of the requested segments from all of the requested wide-angle video sources. In the preferred embodiment, these segments are prepared at the requested resolution. In another embodiment, the server extracts all possible segments from all possible wide-angle video source(s) at a frame-rate(s) it can handle. These extracted segments are extracted at a fixed number of resolutions. As all the possible segments are available, the server may serve an indefinite number of clients. The server sends the requested segment(s) to the appropriate client(s). In a preferred embodiment, segments are sent as a compressed sequence.

The client receives the segments and preferably applies a transformation to generate a client view image (virtual camera view). The transformation is based on any of a number of techniques, for example, possibly one of:

(1) tabular distortion-correction methods;
(2) 3D projection methods; and
(3) 2D transform mapping methods.

Figure 6:
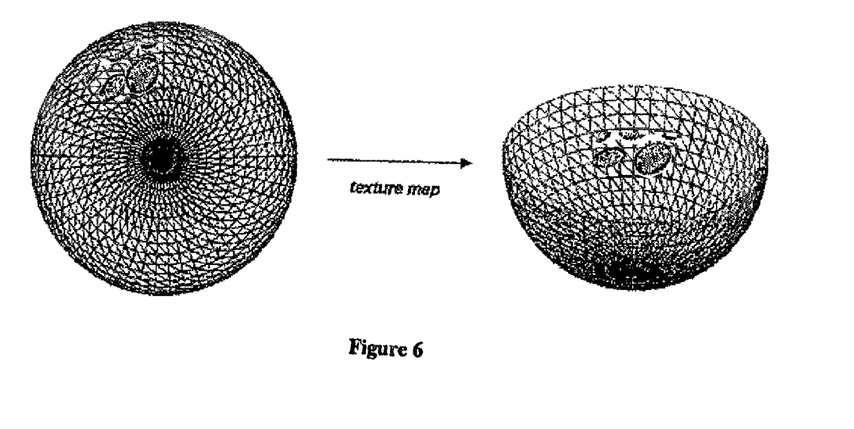
FIG. 6 shows another example method consistent with a preferred embodiment of the present innovations.
Figure 7A:
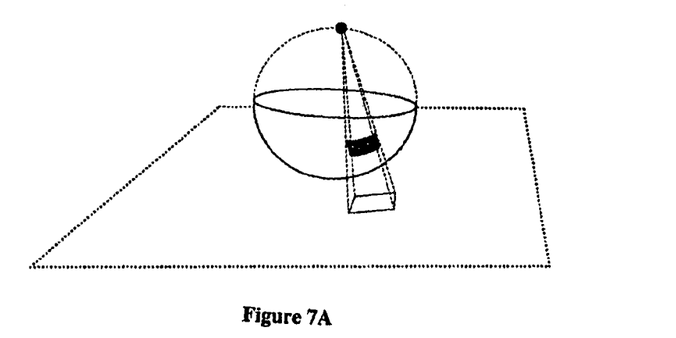
FIG. 7 shows another example method consistent with a preferred embodiment of the present innovations.
Figure 7B:
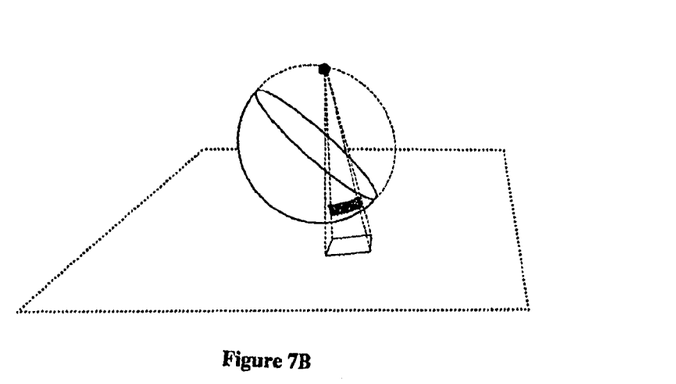

Other methods can also be implemented. The preferred embodiment uses client 3D graphics hardware to implement the second category of transformation. The sources provide video captured using a fisheye lens in the preferred embodiment. The received segment data is used to create a fisheye image consisting of partial useful information (partial image). The partial image is texture mapped onto a triangulated surface representing a partial sphere with unity radius, such as that shown in the example of FIG. 6. The undefined areas of the texture, for which no segments were received, are preferably filled with an arbitrary pixel color. The mapping preferably uses a well-known 3D computer graphics technique and can be implemented by storing information representing an approximately circular grid of triangles to assign the texture. Other means of mapping can also be implemented. In the preferred embodiment the mapped texture is stereographically projected onto a plane (image plane) representing the client view, a method disclosed in U.S. Pat. No. 6,243,099, entitled "Method for Interactive Viewing Full-Surround Image Data and Apparatus Therefore," which is hereby incorporated by reference. The model is described by a spherical polar coordinate system with an origin in the centre of the partial sphere. The client view is defined by the known pan, tilt and horizontal and vertical fields-of-view (FOV). The image plane is tangential to the partial sphere and intersects at a point defined by the pan and tilt, as shown in FIGS. 7A and 7B. The intersection point and the FOVs preferably define the points that need to be projected to create the client view. Projecting rays from the antipodal point of the plane/sphere intersection results in a stereographic projection; rays projected from the centre of the partial-sphere results in a linear perspective projection. In a further embodiment, the projection point can be moved between these two positions in response to zoom PTZ commands. This represents a hybrid use of stereographic and linear perspective projection (and states between), a method as suggested in U.S. Prov. Pat. App. No. 60/681,109, entitled "Stereographic Correction in a Camera," which is hereby incorporated by reference.

Alternative transformation techniques can be used to alleviate the distortion. A preferred embodiment may use a transformation belonging to one of the other categories if a client does not have 3D graphics hardware. The first category includes U.S. patent application Ser. No. 10/837,012, entitled "Correction of Optical Distortion by Image Processing," which is hereby incorporated by reference. The distortion is corrected by reference to a stored table that indicates the mapping between pixels in the distorted wide-angle image and pixels in the corrected image. On the other hand, U.S. patent application Ser. No. 10/186,915, entitled "Real-Time Wide-Angle Image Correction System and Method for Computer Image Viewing," which is hereby incorporated by reference, generates warp tables from pixel coordinates of a wide-angle image and applies the warp tables to create a corrected image. A third category includes U.S. Pat. No. Re 36,207, entitled "Omniview Motionless Camera Orientation System," which is hereby incorporated by reference, which discloses a system and method of perspective correcting views from a hemispherical image using 2D transform mapping. The correction is achieved by an image-processor implementing an orthogonal set of transform algorithms. The transformation is predictable and based on lens characteristics. These examples are only intended to be illustrative, and do not limit the potential application of other methods of transformation to the present innovations.

In a preferred embodiment, each client has multiple virtual cameras capable of viewing portions from one or more wide-angle video sources. A client can issue view-requests for the one or more sources using their unique source IDs. A portion (group of segments) is received for each view-request, wherein each portion is processed and distortion-reduced to generate a different view. A composite video is generated from these multiple views, wherein each view occupies a part of said composite video and the composite can be output for display.

In another embodiment, the server is capable of storing the latest view-request issued by a client. The server continues sending the same portion(s) to said client until either a new view-request is sent, or a specified time-out occurs (to ensure that portions are not indefinitely sent to a client which has disconnected since issuing a view-request).

Figure 8:
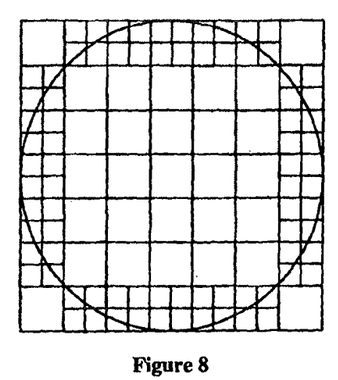
FIG. 8 shows another example method consistent with a preferred embodiment of the present innovations.

In other embodiments, the server is capable of dividing wide-angle video images into non-regular and/or non-rectangular segments. An image may be segmented using a "quadtree", as depicted in FIG. 8, as mentioned in U.S. Pat. No. 6,526,176, entitled "Efficient Processing of Quadtree Data," which is hereby incorporated by reference. Possible embodiments may segment based on concentric circular rings, or another mathematical segmentation model.

In a further embodiment, the server sends information with the portions (or segments) describing the position in the wide-angle image from which each portion (or segment) has been extracted. This information can take the form of tag associated with each segment. The server may also be capable of sending client view coordinates (e.g. pan, tilt, horizontal and vertical FOVs) corresponding to viewing these portions. This functionality is particularly useful in guiding a client view to a region of interest, notably when the client first connects to a new video source.

An additional embodiment implements a server capable of distributing a copy of every segment from the requested source to each requesting client, wherein the segments requested by a client are fed to said client at a high resolution, and other segments are fed at a lower resolution. This method and systems empowers the client with a full situational awareness, while still retaining the advantage of an alleviated bandwidth problem.

In other embodiments, more sophisticated methods can be used to identify the required segments, in which only part of the view pixels p need be used. In an embodiment, only the points in the perimeter of the client view and one point in the centre of the view are used to generate associated segment identifiers. The server is capable of determining any segments which lie within said closed perimeter of segments. In an embodiment the server uses "filling" to determine these unspecified segments, wherein the segment associated with the point in the view centre is used as the "seed", which is a method that will be familiar to those skilled in the art. In a further embodiment the clients request additional predicted segments based on extrapolating past PTZ commands. This can assist in creating a more real-time experience.

An additional embodiment implements a server capable of transforming any input wide-angle video to generate a panoramic video, possibly using a transformation engine with cylindrical projection, wherein said panoramic video is distributed to the clients alongside portions. Another embodiment generates the panoramic video in transformation engines in the wide-angle sources, and feeds them to the server together with the normal wide-angle video. The server again has the capability to distribute both segments and panoramic video sequence(s) to the multiple clients in response to view-requests and possible client characteristics. Other projection styles may be implemented in the transformation, such as cylindrical projection.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Additional general background, which helps to show variations and implementations, may be found in the following publications, all of which are hereby incorporated by reference:

U.S. Pat. No. 6,603,502, entitled "System for Omnidirectional Image Viewing at a Remote Location Without the Transmission of Control Signals to Select Viewing Parameters," which is hereby incorporated by reference.

U.S. Pat. No. Re 36,207, entitled "Omniview Motionless Camera Orientation System," which is hereby incorporated by reference.

U.S. Pat. No. 4,728,839, entitled "Motorized Pan/Tilt Head for Remote Control," which is hereby incorporated by reference.

U.S. Pat. No. 6,243,099, entitled "Method for Interactive Viewing Full-Surround Image Data and Apparatus Therefor," which is hereby incorporated by reference.

U.S. Pat. No. 6,526,176, entitled "Efficient Processing of Quadtree Data," which is hereby incorporated by reference.

U.S. patent application Ser. No. 10/837,012, filed Apr. 30, 2004, entitled "Correction of Optical Distortion by Image Processing," which is hereby incorporated by reference.

U.S. patent application Ser. No. 10/837,325, filed Apr. 30, 2004, entitled "Multiple View Processing in Wide-Angle Video Camera," which is hereby incorporated by reference.

U.S. patent application Ser. No. 10/837,019, filed Apr. 30, 2004, entitled "Method of Simultaneously Displaying Multiple Views for Video Surveillance," which is hereby incorporated by reference.

U.S. patent application Ser. No. 10/186,915, entitled "Real-Time Wide-Angle Image Correction System and Method for Computer Image Viewing," which is hereby incorporated by reference.

U.S. Provisional Patent Application Ser. No. 60/627,531, filed Nov. 12, 2004, entitled "Interactive Media Server," which is hereby incorporated by reference.

U.S. Provisional Patent Application Ser. No. 60/681,109, filed May 13, 2005, entitled "Stereographic Correction in a Camera," which is hereby incorporated by reference.

"Fundamentals of Digital Image Processing" by Anil Jain, Prentice-Hall, NJ, 1988, which is hereby incorporated by reference; Mathworld: Coordinate Geometry, *"Spherical Coordinates"*,
Wolfram Research [Nov. 18, 2005]
http://mathworld.wolfram.com/SphericalCoordinates.html None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A system for remotely viewing wide-angle video, comprising:
    a server at a first location receiving distorted wide-angle video images from one or more sources;
    a client at a remote second location requesting from said server one or more rectangular distorted segments overlapped by a client-selected distorted portion within and smaller than a distorted wide-angle video image from a specified source, while specifying resolution of said overlapped distorted segments;
    wherein said server outputs said overlapped distorted segments at said specified resolution; and
    wherein said client receives said overlapped segments and generates a virtual camera view with reduced distortion by transforming said overlapped segments.

2. A system as recited in claim 1 wherein said client is capable of generating multiple virtual camera views by requesting segments overlapped by multiple portions of one or more wide-angle images.

3. A system as recited in claim 1 wherein said server is capable of serving multiple clients each requesting separate segments.

4. A system as recited in claim 1 wherein said transformation is based on 3D graphics techniques, using texture-mapping for stereographic projection or linear perspective projection or cylindrical projection.

5. A system as recited in claim 1 wherein said transformation is based on tabular distortion-correction.

6. A system as recited in claim 1 wherein said transformation is based on 2D transform mapping using orthogonal transform algorithms.

7. A system as recited in claim 1 wherein said client generates said virtual camera view with view coordinates based on a pan and/or tilt and/or zoom value derived from local device input such as a mouse or a joy stick.

8. A system as recited in claim 7 wherein said virtual camera view coordinates are sent from said server together with portion of a wide-angle video image and said client generates virtual camera view based on received information.

9. A system as recited in claim 1 wherein said request is based on a pan and/or tilt and/or zoom and/or field-of-view value corresponding to virtual camera view coordinates, and said server computes corresponding portion.

10. A system as recited in claim 1 wherein said server output response to said requests and corresponding virtual camera view generation at the client occurs in approximately real-time.

11. A system as recited in claim 1 wherein said server continues sending segments to a client corresponding to last request to provide approximate real-time video viewing at said client.

12. A system as recited in claim 1 wherein said portion comprises of a plurality of segments.

13. A system as recited in claim 12 wherein said segment generation is based on segmenting said wide-angle image by a regular grid.

14. A system as recited in claim 13 wherein said request is based on a binary image representing said grid.

15. A method for remotely viewing wide-angle video, comprising the steps of:
    outputting from a first location, with at least one specified resolution, at least one rectangular distorted segment overlapped by at least one portion within and smaller than a distorted wide-angle video image, along with information which at least partially describes the distortion of said segment, in response to a request from a second location which specifies said segment and said specified resolution; and
    receiving at a second location said segment and said information, and generating at least one corresponding distortion-alleviated view from said segment using said information.

16. A method as recited in claim 15 wherein said information includes a table describing the properties of the device used to capture said wide-angle video.

17. A method for remotely viewing wide-angle video comprising the steps of:
    outputting from a first location, with a specified resolution, one or more rectangular distorted uncorrected segments overlapped by a distorted uncorrected portion within and smaller than a distorted wide-angle video image, in response to a request from a second location which identifies at least some positional information for said distorted uncorrected portion;
    wherein said request specifies resolution of said distorted uncorrected segments.

18. A method as recited in claim 17 wherein said first location services multiple remote locations.

19. A method as recited in claim 17 wherein said second location outputs positional information for multiple portions from one or more wide-angle-video images.

20. A method as recited in claim 17 wherein said output from said second location is based on a pan and/or tilt and/or zoom and/or field-of-view value(s) derived from local device input.

* * * * *